United States Patent [19]

Vierling

[11] 4,064,840
[45] Dec. 27, 1977

[54] METHOD AND APPARATUS FOR OXIDIZING A FUEL IN AN INTERNAL COMBUSTION ENGINE

[76] Inventor: Donald E. Vierling, 11309 Toledo Drive, Austin, Tex. 78759

[21] Appl. No.: 744,981

[22] Filed: Nov. 26, 1976

[51] Int. Cl.² .................. F02B 43/08; F02B 75/12; F02B 33/00
[52] U.S. Cl. .................. 123/3; 123/1 R; 123/1 A; 123/119 A
[58] Field of Search .......... 123/1 A, 1 R, 3, 119 A; 123/119 E, DIG. 12; 23/281; 431/12, 76

[56] References Cited
U.S. PATENT DOCUMENTS

| | | | |
|---|---|---|---|
| 3,709,203 | 1/1973 | Cettin | 123/3 |
| 3,773,680 | 11/1973 | Huebler | 23/281 |
| 3,792,690 | 2/1974 | Cooper | 123/3 |
| 3,817,232 | 6/1974 | Nakajima | 123/119 A |
| 3,977,365 | 8/1976 | Vierling | 123/3 |

Primary Examiner—Charles J. Myhre
Assistant Examiner—William Randloph
Attorney, Agent, or Firm—Martin J. Carroll

[57] ABSTRACT

A mixture of air, oxygen and engine exhaust gases is added to a fuel and fed to an internal combustion engine in controlled amounts to reduce the amount of toxic material formed. The oxygen is supplied by a plurality of oxygen converters arranged in parallel so that one or more of the converters are charging while one or more of the remaining converters are discharging oxygen. Each converter includes an inner chamber having a fluidized bed of a metallic oxide surrounded by a heating chamber. Engine exhaust gases are fed to the heating chamber to raise the temperature of the metallic oxide to that at which a higher oxide is formed. To obtain oxygen the temperature of the fluidized bed is raised by means of the exhaust gases to that at which oxygen is released and the original metallic oxide is formed.

12 Claims, 2 Drawing Figures

METHOD AND APPARATUS FOR OXIDIZING A FUEL IN AN INTERNAL COMBUSTION ENGINE

This invention relates to a method and apparatus for oxidizing fuel in an internal combustion engine and more particularly to burning a fuel in an internal combustion engine with a reduction in the amount of toxic substances produced. U.S. Pat. No. 3,977,365 dated Aug. 31, 1976 in which I am joint patentee with Howard S. Orr, discloses a method of which this invention is an improvement. The method and apparatus disclosed in the patent does not disclose how the oxygen or enriched air is obtained and it is to this feature that the present application is particularly directed. The patent contemplates using a storage tank for the oxygen which requires that the oxygen be bought at intervals. This is inconvenient and expensive.

Nakajima et al. U.S. Pat. No. 3,817,232 dated June 18, 1974 discloses a method and apparatus for oxidizing fuel in an internal combustion engine wherein means are provided for obtaining oxygen or enriched air. This patent fails to appreciate that, for practical purposes, some air must be provided for the engine substantially all the time. The oxygen producer is a nitrogen impermeable membrane or a molecular sieve. These may be in two or more sections so that one section can be in use while the other is being purged. These have various disadvantages including cost.

Cettin et al. U.S. Pat. No. 3,709,203 dated Jan. 9, 1973 discloses an anti-pollution system for engines in which oxygen is obtained by the decomposition of an alkali metal perchlorate salt and mixed with exhaust gases in an amount equal to the nitrogen in air. It is not clear how the lithium chloride is regenerated, but it appears that it is not done while in the automobile.

Cooper U.S. Pat. No. 3,792,690 dated Feb. 19, 1974 also relates to the manufacture of hybrid air and discloses various ways of producing oxygen including Brin's process. However, there is no indication that more than one oxygen producer is used and details of the apparatus are not disclosed.

Applicant's invention relates to utilizing Brin's process in a particular manner so that an automible engine or the like can be operated inexpensively to meet pollution standards.

It is therefore an object of my invention to provide a method of oxidizing a fuel in an internal combustion engine which cheaply manufactures and utilizes oxygen in a greater ratio than in air to reduce the amount of toxic materials produced without reducing engine efficiency.

Another object is to provide apparatus for oxidizing fuel which cheaply manufactures and utilizes oxygen in a greater ratio than air.

These and other objects will become more apparent after referring to the drawing in which.

Figure 1:
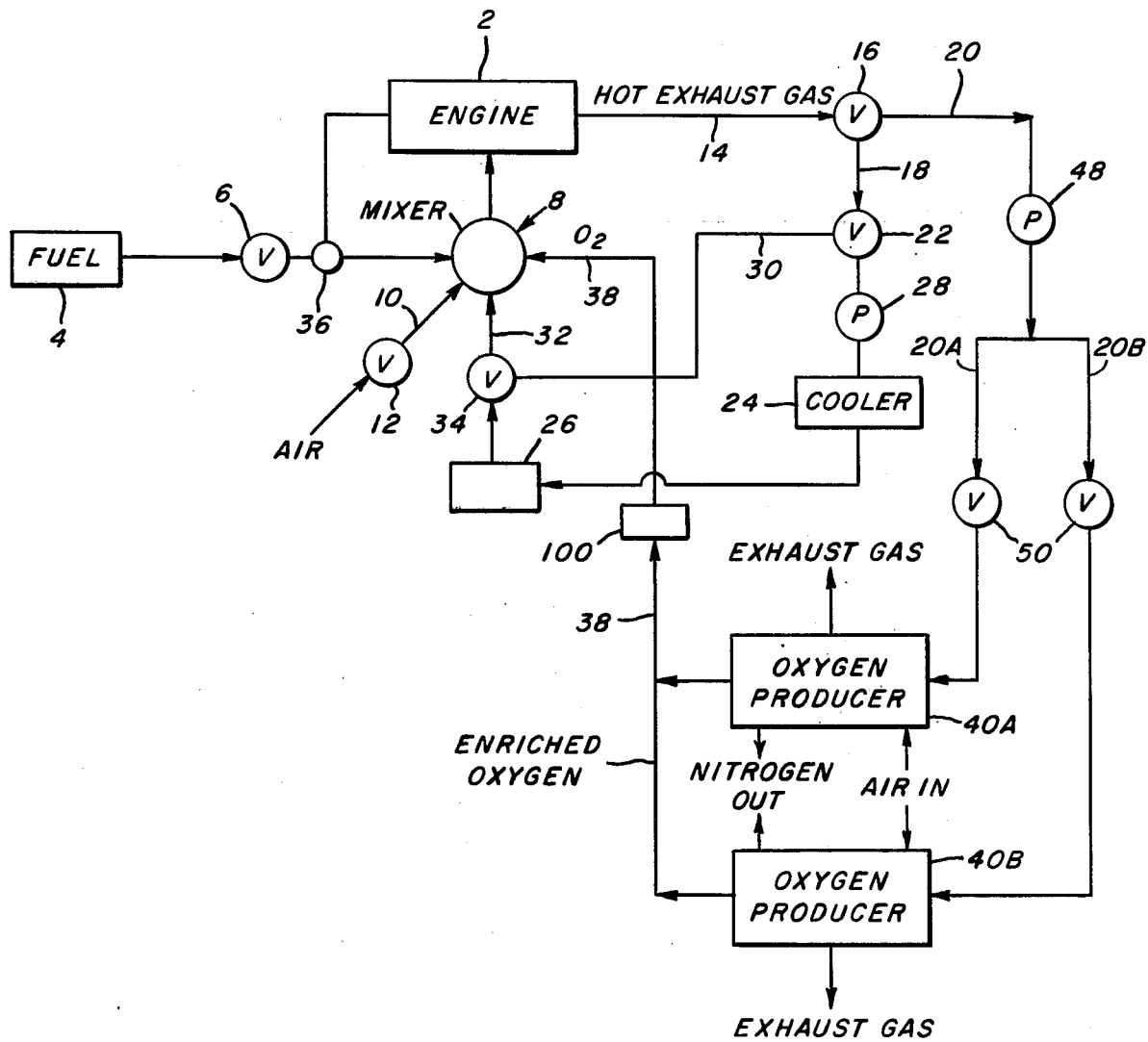
FIG. 1 is a schematic view of the apparatus of my invention.

Referring more particularly to the drawings reference numeral 2 indicates an internal combustion engine particularly for use in an automobile. Fuel, such as gasoline or hydrogen, is fed from tank 4 through valve 6 to a proportional mixer 8. An air conduit 10 with a control valve 12 therein leads to the mixer 8. Hot exhaust gases from the engine 2 pass through conduit 14. A proportional valve 16 in conduit 14 divides the flow of exhaust gases into conduits 18 and 20. A pressure control valve 22 in conduit 18 controls flow of exhaust gases through conduit 18 and a cooler 24 to a tank 26. A pump 28 in conduit 18 provides the desired pressure. Pressure in tank 26 controls operation of valve 22 through lead 30. A conduit 32 having a shut off valve 34 therein leads from tank 26 to mixer 8. The flow of fuel may be controlled by a temperature controller 36 operated by the temperature in engine 2 to prevent overheating. Oxygen or enriched air is supplied to mixer 8 through conduit 38. The above described apparatus is essentially as shown in Vierling et al U.S. Pat. No. 3,977,365 dated Aug. 31, 1976.

Figure 2:
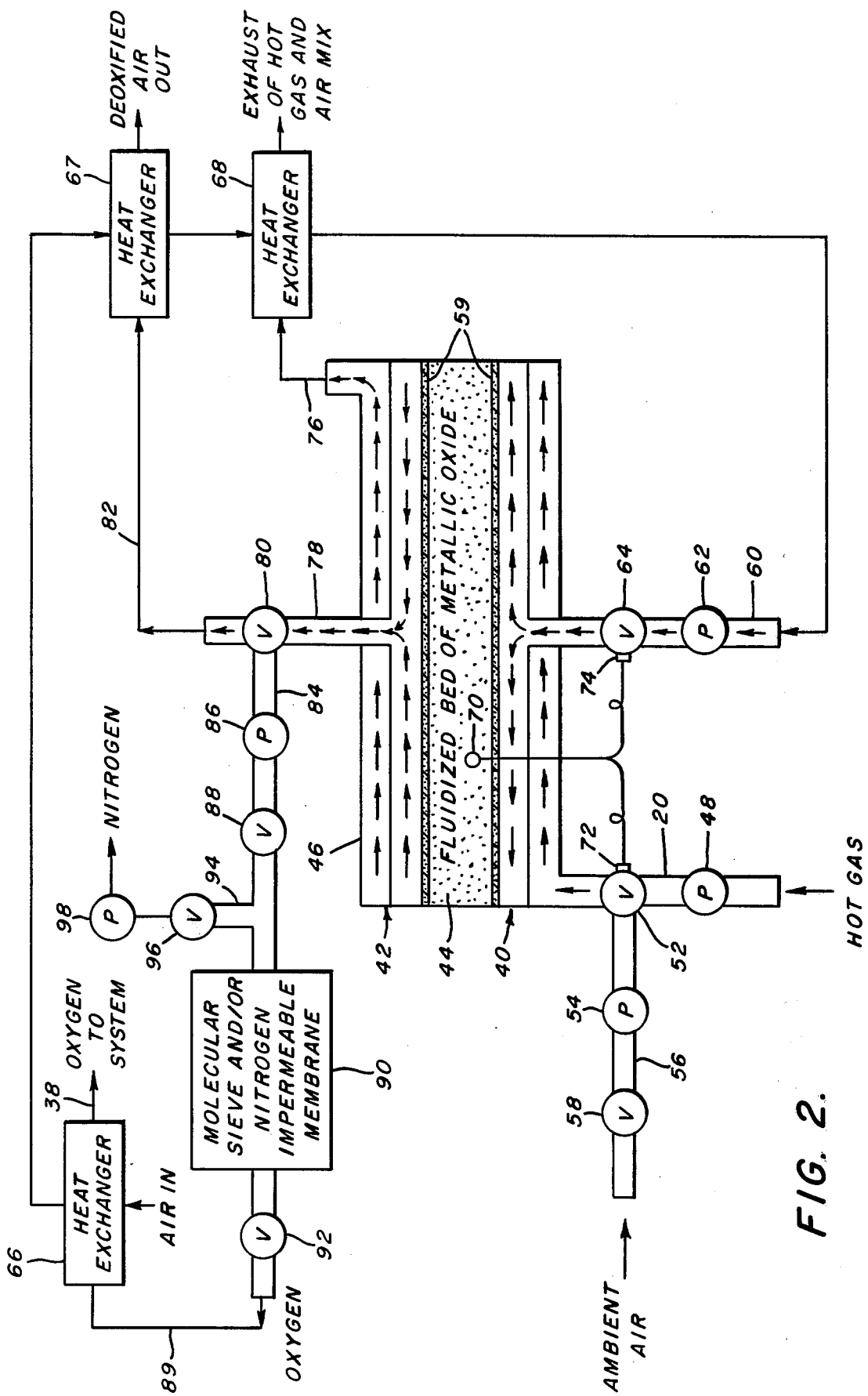
FIG. 2 is a schematic view of the oxygen producer of my invention.

According to the present application I provide at least two, and preferably more, oxygen producers 40A and 40B. As shown in FIG. 2, each producer includes a container 42 having a central chamber 44 surrounded by an annular heating chamber 46. A pump 48 is provided in conduit 20 which is then divided into branches 20A and 20B or, if more than two oxygen producers are used, into one branch for each producer. A valve 50 is provided in each branch to separately control flow of exhaust gases to the associated producer. Each conduit 20A and 20B is connected to the heating chamber 46 of its associated producer 40A or 40B through a mixing valve 52. A pump 54 supplies ambient air to valve 52 through a conduit 56 also having a control valve 58 therein. A fluidized bed of a metallic oxide, such as barium oxide (BaO) is provided in the central part of chamber 44 and maintained in position by a porous or perforated wall 59. While the bed of oxide is preferably fluidized to increase the speed of the reaction it could be an ordinary bed. Air is delivered to chamber 44 through a conduit 60 having a pump 62 and control valve 64 therein. Heat exchangers 66, 67 and 68, preferably of the recuperator type, are provided in conduit 60. A temperature sensing device 70 is provided in the fluidized bed chamber and is connected to controls 72 and 74 for operation of valves 52 and 64. A conduit 76 leads from chamber 46 to heat exchanger 68. A conduit 78 leads from chamber 44 to a positioning valve 80. A branch conduit 82 leads from valve 80 to the heat exchanger 67. Valve 80 is also connected to a conduit 84 having a pump 86 and valve 88 therein. The conduit 84 is connected through heat exchanger 66 to conduit 38. A molecular sieve and/or nitrogen impermeable membrane 90 and a valve 92 are provided in conduit 89 between valve 88 and heat exchanger 66. A conduit 94 is connected to conduit 84 between valve 88 and molecular sieve 90. A valve 96 and vacuum pump 98 are provided in conduit 94. An oxygen storage tank 100 may be provided in conduit 38.

The system may be operated in several ways. In all cases at least one converter will be discharging oxygen at all times. Assume first that no oxygen or enriched air is available for start up. In that case, which will seldom occur, only fuel and air will be delivered to the mixer 8. Valve 16 will be positioned so that all the waste gases go into conduit 20. Either or both valves 50 will be opened and the hot exhaust gases will be fed to each operating converter through its associated valve 52. Ambient air will be provided through conduit 56 only if it is required to cool the hot exhaust gases. At the same time, air is fed to each operative converter through valve 64. This air obtains its optimum pressure by means of pump 62 and passes through the pervious wall 59 into and through the fluidized bed and is discharged through valve 80 to heat exchanger 67 and then to the atmosphere. The controls 72 and 74 operate valves 52 and 64 to bring the metallic oxide to the optimum temperature to form barium dioxide by reaction between the barium oxide and the oxygen of the air. This temperature is about 500° C for barium oxide, but may vary for other metallic oxides. It will be understood that the specific metallic oxides used are not part of my invention, but are well known in the art. It is only necessary that the oxide combine with oxygen at one temperature to form a higher oxide which will release oxygen at a different temperature which in most cases will be a higher temperature and the description hereafter will be directed to this specific case. When the optimum amount of the metallic dioxide is formed valve 64 is closed and valve 80 is positioned to discharge to heat exchanger 66. At the same time that valve 64 is closed, control 72 is set to rapidly raise the temperature of the metallic dioxide to the optimum for converting the metallic dioxide to the oxide and releasing oxygen which is then fed to the mixer 8 or storage tank 100. At this time valve 16 is set to deliver some of the exhaust gases to conduit 18 and the amount of air delivered to the mixer is decreased. Since both producers are in discharge condition both valves 50 will be closed, but only one of the producers will have its temperature raised to discharge oxygen. The system will then operate as in the Vierling et al patent.

When the metallic dioxide is converted back to the oxide, the converter is recharged as described above while the other converter is discharged as described above.

Since it is only necessary that the amount of nitrogen be reduced the operation may be varied so that the oxygen formed is contaminated with nitrogen and a lesser percentage of air and/or exhaust gases will be fed to the mixer 8.

When a molecular sieve and/or nitrogen impermeable membrane are used to upgrade the oxygen to the system they are purged of nitrogen while the metallic dioxide is being formed in the converter. At this time valves 88 and 92 will be closed and valve 96 opened. Vacuum pump 98 then is operated to purge the nitrogen after which valve 96 is closed, valves 88 and 92 opened and pump 98 shut off.

It will be understood that the heat exchangers 66, 67, and 68 are used only to increase the efficiency of the system and may be omitted.

Any number of converters may be used and it is desirable to have at least one ready for discharge of oxygen at all times. Then by using a small oxygen storage tank 100 which contains oxygen when the engine is stopped, the engine can be restarted without objectionable discharge at all times.

This system provides a wide range of operation to limit pollutants legally acceptable in the exhaust. It may be operated as set forth in the above identified Vierling et al patent, especially if an oxygen enricher is used. On the other hand less pure oxygen can be obtained from the oxygen converter with a subsequent decrease in the percentage of ambient air supplied. The amount of nitrogen supplied to the mixture should not exceed 70% by weight.

While one embodiment of my invention has been shown and described, other adaptations and modifications may be made without departing from the scope of the following claims.

I claim:

1. In the method of substantially completely oxidizing a fuel in an internal combustion engine having a combustion chamber wherein a mixture of oxygen, air and engine exhaust gases are added to said fuel and individually controlled so that the nitrogen in the mixture does not exceed 70% by weight of the mixture, and said fuel and mixture are fed to and burned in said chamber during substantially all operation of said engine; the improvement which comprises providing a plurality of beds of a metallic oxide, supplying exhaust gases from said engine around one of said beds of metallic oxide to change the temperature of said metallic oxide to that at which the metallic oxide readily combines with oxygen to form a higher oxide, passing air through said heated bed of metallic oxide to form said higher oxide, stopping flow of said air through said bed when the higher oxide is formed, then supplying exhaust gases from said engine around said bed of metallic oxide to change the temperature of said metallic oxide to that at which the higher metallic oxide breaks down to the metallic oxide and releases oxygen, feeding the oxygen released by said last named reaction to form said mixture until the said bed is essentially returned to its original state while said one of said beds is feeding oxygen to form said mixture supplying exhaust gases from said engine around another of said beds of metallic oxide to change the temperature of said metallic oxide to that at which the metallic oxide readily combines with oxygen to form a higher oxide, passing air through said heated bed of metallic oxide to form said higher oxide, stopping flow of said air through said bed when the higher oxide is formed, then supplying exhaust gases from said engine around said bed of metallic oxide to change the temperature of said metallic oxide to that at which the higher metallic oxide breaks down to the metallic oxide and releases oxygen, feeding the oxygen released by said last named reaction to form said mixture until the said bed is essentially returned to its original state, and then repeating the above steps with at least one of said beds releasing oxygen while at least another of said beds is having its temperature changed to form the higher oxide.

2. The method of claim 1 in which ambient air is mixed with the exhaust gases being fed to the said bed to control the temperature thereof.

3. The method of claim 1 in which heat is added to the air being fed to said bed by means of the exhaust gases and deoxified air leaving said beds.

4. The method of claim 3 in which the temperature of the oxygen leaving said bed is lowered by raising the temperature of air being fed to said bed.

5. In apparatus for substantially oxidizing a fuel in the combustion chamber of an internal combustion engine including a mixer, means for controlling flow of fuel to said mixer, means for controlling flow of air to said mixer, means for controlling flow of engine exhaust gases to said mixer, and means for supplying a controlled amount of oxygen to said mixer: the improvement comprising a plurality of oxygen converters arranged in parallel, each of said converters including an inner chamber adapted to receive a bed of metallic oxide and a heating chamber around said metallic oxide chamber, a first conduit connecting exhaust from said engine to said heating chamber, a second conduit for delivering air to said metallic oxide bed, a third conduit leading from said metallic oxide chamber, a valve in said third conduit, a fourth conduit leading from said valve to the oxygen supply means to said mixer, means for shutting off flow of air to said bed when said metallic oxide has been converted to a higher oxide, and control means for maintaining the temperature of said bed at that which the higher oxide is formed while air is flowing therethrough and then changing said temperature to that at which oxygen is released when it is desired to feed oxygen from said converter to said mixer, said valve being movable from a position where deoxidized air is discharged from the system while air is being fed to the converter to a position where it connects the third and fourth conduits while oxygen is being fed from the converter, whereby one of said converters can be discharged while another converter is being charged.

6. The combination of claim 5 including a pair of heat exchangers located in said second conduit, means for feeding the exhaust gases leaving said converter to one of said heat exchangers, and means for feeding the deoxidized air to the other of said heat exchangers.

7. The combination of claim 5 including means for supplying ambient air to said first conduit to control the temperature of the gases being fed to said heating chamber.

8. The combination of claim 7 including a pair of heat exchangers located in said second conduit, means for feeding the exhaust gases leaving said converter to one of said heat exchangers, and means for feeding the deoxidized air to the other of said heat exchangers.

9. The combination of claim 8 including a third heat exchanger located in said second conduit, and means for supplying oxygen being discharged to said third heat exchanger.

10. The combination of claim 5 including an oxygen purifier located in each of said fourth conduits for upgrading the oxygen passing therethrough.

11. The combination of claim 5 in which said control means includes a temperature sensing device in said bed, and means operable by said temperature sensing device to control the heat being supplied to said bed.

12. The combination of claim 5 in which each of said oxygen converters includes a pervious wall in said inner chamber providing a space between it and the inner wall of said heating chamber, and said bed is a fluidized bed located within said pervious wall.

* * * * *